United States Patent Office 2,943,055
Patented June 28, 1960

2,943,055
BARIUM 12-HYDROXY STEARATE GREASE CONTAINING A BORON ESTER COMPOUND

Harry J. Worth, Fullerton, Calif., assignor to Union Oil Company of California, Los Angeles, Calif., a corporation of California No Drawing. Filed Mar. 21, 1958, Ser. No. 722,835
9 Claims. (Cl. 252—40.7)

This invention relates to lubricating compositions and particularly lubricating greases containing barium soaps. More particularly it relates to barium 12-hydroxy stearate greases having a high melting point, good shear stability, and good reversibility.

Simple barium soaps have not been found to produce greases having the desirable high temperature characteristics, reversibility and the like. Attempts to produce simple barium soap greases have included the use of the barium soap of 12-hydroxystearic acid. Although products having good grease consistencies at ordinary temperatures are produced with barium 12-hydroxy stearate, these greases are not reversible, they have relatively low dropping points and they require large proportions of soap in order to obtain reasonable penetration values.

An object of this invention is to produce a barium soap grease which has a high melting point, a low soap content for a given penetration, good reversibility and good shear stability.

Another object of this invention is to produce a barium soap grease having the mentioned characteristics using barium 12-hydroxy stearate as the thickening agent.

A further object of this invention is to provide a method of producing a barium 12-hydroxy stearate grease having the above described characteristics.

Other objects, features and advantages of this invention will be apparent from the description which follows.

It has been found that a grease having all of the above characteristics is obtained by adding to barium 12-hydroxy stearate grease, or including as a part of the composition of such a grease, a small amount of boron compound prepared by reacting orthoboric acid with an alkanolamine at somewhat elevated temperatures to produce an ester product which is soluble or at least dispersible in the grease mixture. It is to be noted that where the term "boric and" is used, it refers to orthoboric acid, $H_3BO_3$.

The structure of the boron compound is not known but the product is believed to be an ester of boric acid in which two of the acid groups of the boric acid are esterified. Compounds useful in preparing the boron compounds, that is, which may be reacted with orthoboric acid to produce the desired compounds or esters, have the following general formula:

$$R_xN(R'OH)_{3-x}$$

in which R represents hydrogen or a hydrocarbon radical, R' represents a divalent alkyl radical having 2 to 3 carbon atoms per molecule and $x$ represents a whole number of 0 to 2, inclusive. The hydrocarbon radicals include alkyl radicals of 1 to 20 or more carbon atoms, alkyl substituted or unsubstituted cyclic aliphatic radicals and aryl radicals which radicals may be substituted with one or more alkyl groups. Compounds in which $x$ is 0 are represented by triethanolamine and tripropanolamine. Compounds in which $x$ is 1 are represented by diethanolamine, methyl diethanolamine, ethyl diethanolamine, octyl diethanolamine, cyclohexyl diethanolamine, diemethylcyclohexyl diethanolamine, phenyl diethanolamine and the corresponding dipropanolamines. Compounds in which $x$ is 2 are represented by monoethanolamine, dimethyl ethanolamine, diisobutyl ethanolamine, dinonyl ethanolamine, dioctadecyl ethanolamine, dicyclohexyl ethanolamine, di(methylcyclopentyl) ethanolamine, diphenyl ethanolamine, ditolyl ethanolamine and the corresponding propanolamines. Of the above compounds, the ethanolamine derivatives are preferred and triethanolamine is particularly preferred.

In preparing the boron ester of the above compounds, the alkanolamine is reacted with orthoboric acid at temperatures between about 215° F. and about 350° F. to 400° F. for a period of about 0.25 hour to about 2 hours. The heating is carried out in an open vessel which is preferably equipped with means for stirring or agitating and mixing the reactants and also with means for heating. A steam jacketed or electrically heated kettle, such as one used for grease making, is very satisfactory. When the heating is finished and the reaction completed, the product is clear and entirely free from unreacted solid boric acid. When cooled to room temperature, the product is liquid to solid depending upon the alkanolamine employed.

The reacting ratio of alkanolamine to orthoboric acid is 1 chemical equivalent of the alkanolamine, based on hydroxyl groups, to 1.5 equivalents of the acid. Thus, in reacting triethanolamine (3 hydroxy groups) with boric acid, 1 mol of the amine will be reacted with 1.5 mols of the acid. Correspondingly, 1 mol of phenyl diethanolamine (2 hydroxyl groups), will be reacted with 1 mol of boric acid and 1 mol of dioctyl ethanolamine (1 hydroxyl group) will be reacted with 0.5 ml of boric acid to obtain the desired product. While the stated reacting ratio is the most desirable ratio, this can be varied somewhat and a satisfactory product will be obtained. Thus for each equivalent, or stated in another way, for each hydroxyl group of the alkanolamine, between about 1.4 and 1.7 equivalents of boric acid should be employed.

In preparing the finished grease of this invention, a grease kettle is charged with 12-hydroxystearic acid and preferably between about 20% and about 40% by weight of the total lubricating oil which is to be used in preparing the grease batch and this mixture is heated to a temperature of about 150° F. to about 205° F. To this heated mixture is added an amount of a basic barium compound such as the oxide or hydroxide, preferably a hydrated oxide or hydroxide such as barium hydroxide pentahydrate, sufficient to completely neutralize the acid. A small amount of water is generally added along with the barium hydroxide although this is not essential when a hydrate form of base is used. Heating and agitating is continued during the neutralization reaction which occurs rapidly. The mixture is then heated to a temperature of at least about 300° F. and not over about 360° F., temperature of about 330° F. being preferred, while adding the remaining lubricating oil necessary to complete the grease formulation.

The boron ester compound can be added at substantially any time during the grease preparation following neutralization of 12-hydroxystearic acid. Preferably it is added at some time during the heating following soap formation and before the maximum temperature has been reached.

The amount of boron compound to be added will be between about 0.05% and about 5.0% by weight of the total composition, preferably between about 0.1% and 2.0% by weight of the boron compound will be employed based on the weight of the grease.

Substantially any grade or type of mineral lubricating oil may be employed, thus oils as light as transformer oils and oils as heavy as bright stocks produce greases having the desired characteristics. Generally, an oil of S.A.E. grade 10-40 or 50 will be used, and these oils will preferably be refined products such as solvent extracted oils having a viscosity index (V.I.) greater than about 10. A solvent treated western naphthenic mineral lubricating oil of S.A.E. 20 or 30 grade having a viscosity index of about 25 is a particularly satisfactory oil. Other oils which are entirely satisfactory are solvent treated and dewaxed western paraffinic mineral lubricating oils having a viscosity index of 80 to 90.

The percentage of soap in the finished grease will generally be between about 3% and about 25-30% by weight. Usually between about 5% and about 20% of soap will give the amount of thickening desired in a grease for most purposes.

As is well understood in the art, small amounts of oxidation inhibitors may be added to the grease. Generally between about 0.2% and about 1% by weight of a conventional oxidation inhibitor such as hydrocarbon substituted diphenyl amine will be used. A particularly satisfactory commercial inhibitor consisting of octylated diphenyl amines is obtainable from R. T. Vanderbilt Inc. under the name of "Agerite Stalite." Phenyl alpha-naphthamine is also a very satisfactory inhibitor. Other well known commercial inhibitors may be used with satisfaction.

Penetration values described herein are determined by means of the Shell micro penetrometer. This apparatus and its method of use are described in "The Institute Spokesman" for March 1943, volume VI, No. 12, pages 1, 4 and 5.

Shear stability of the greases described in the examples herein is determined by means of the Shell roll test. The required apparatus and the method of carrying out this test are described in the "Institute Spokesman" reference cited in the preceding paragraph. In this test, which measures the tendency of a grease to soften or liquify in service, a 90 gram sample of the grease is placed in a closed cylinder together with a weighted roller. The cylinder is then rotated for 4 hours at 160 r.p.m. A penetration test is run on the grease before and after the roll test and the amount of softening determined. An increase in penetration of more than 80 points indicates that the grease will probably not perform satisfactorily in service.

The following examples are illustrative of the invention:

Example I

For purposes of comparison with the greases of this invention, a simple barium 12-hydroxy grease was prepared and its characteristics determined. A grease was prepared from the following materials:

| | Grams |
|---|---|
| 12-hydroxystearic acid | 300 |
| Barium hydroxide pentahydrate | 135 |
| Mineral lubricating oil a | 1200 |
| Oxidation inhibitor b | 5 | a A western naphthenic solvent treated mineral lubricating oil having a viscosity at 100° F. of 500 SUS.
b Octylated diphenylamines.

The 12-hydroxystearic acid and 400 grams of oil were charged to a small grease kettle provided with means for agitation and heating and the mixture heated to 202° F. To this heated mixture was added the barium hydrate and 50 grams of water and heating was continued while adding the remainder of the oil, the maximum temperature being about 330° F. The oxidation inhibitor was added during the addition of oil. The mixture was then cooled while being agitated. The product was very lumpy and non-homogeneous, however, it was smoothed and homogenized by passing it three times through a three roll laboratory paint mill.

The product obtained in the above manner had a shell micro penetration of 129 and an ASTM dropping point of 320° F. This product had a soap content of 23% by weight. When a portion of the grease was placed on a hot plate with a surface temperature between 325° F. and 350° F., considerable oil separation occurred and the mixture remained soft and granular after it had cooled and had been worked with a spatula. Obviously the grease was not reversible, i.e. after being heated and cooled it lost its grease structure. In the Shell roll test this grease softened about 100 points.

Example II

A grease of this invention was prepared with the following ingredients:

| | Grams |
|---|---|
| 12-hydroxystearic acid | 300 |
| Barium hydroxide pentahydrate | 135 |
| Mineral lubricating oil a | 2200 |
| Oxidation inhibitor b | 5 |
| Boron ester compound c | 6.5 | a A western naphthenic solvent treated mineral lubricating oil having a viscosity at 100° F. of 500 SUS.
b Phenyl alphanaphthylamine.
c The reaction product obtained by heating a mixture of 60% by weight of triethanolamine with 40% by weight of orthoboric acid to a temperature of 220° F. for a period of 20 minutes. The product was permitted to cool, and when cool formed a clear viscous liquid.

The 12-hydroxystearic acid and 400 grams of the mineral lubricating oil were charged to a small grease kettle and heated to approximately 200° F. To this heated mixture was added the barium hydroxide and a small amount of water and the mixture agitated and heated to complete neutralization. With continued heating and agitating, the boron ester compound, oxidation inhibitor and the remainder of the mineral lubricating oil was added. The oil was added slowly while heating to a maximum temperature of about 350° F. The resulting product was cooled with mild agitation to about 100° F. The grease obtained in this manner had a soap content of 14.2%, a penetration of 124, an ASTM dropping point of 352° F., and in the Shell roll test it hardened 11 points. This grease was reversible on the hot plate.

Example III

A grease of this invention was prepared with the following ingredients:

| | Grams |
|---|---|
| 12-hydroxystearic acid | 300 |
| Barium hydroxide pentahydrate | 135 |
| Mineral lubricating oil a | 2200 |
| Agerite Stalite | 5 |
| Boron ester compound b | 10 | a An S.A.E. 30 western solvent treated and dewaxed paraffinic mineral lubricating oil.
b The reaction product obtained by heating a mixture of 21 grams of diethanolamine and 12.4 grams of orthoboric acid to a temperature of 250° F. and cooling the reaction product.

This grease was prepared following the method described in Example II. Resulting grease contained 14.2% by weight of soap. It had a penetration of 125, an ASTM dropping point of 350° F., and was reversible on the hot plate. In the Shell roll test it softened 5 points.

Example IV

A grease of this invention was prepared with the following ingredients:

| | Grams |
|---|---|
| 12-hydroxystearic acid | 300 |
| Barium hydroxide pentahydrate | 135 |
| Phenyl alphanaphthylamine | 5 |
| Boron ester compound a | 10 |
| Mineral lubricating oil b | 1600 | a This product was obtained by heating 60% by weight of triethanolamine and 40% by weight of boric acid to a temperature of 300° F. and permitting the product to cool. This compound was a clear, hard mass.
b An S.A.E. 30 western solvent treated naphthenic mineral lubricating oil.

This grease was prepared following the method outlined in Example II. It had a soap content of 18.5%, a penetration of 159, an ASTM dropping point of 362° F., it softened 12 points in the Shell roll test and it showed good reversibility on a hot plate.

Example V

A grease of this invention was prepared with the following ingredients:

| | Grams |
|---|---|
| 12-hydroxystearic acid | 300 |
| Barium hydroxide pentahydrate | 135 |
| Mineral lubricating oil [a] | 2200 |
| Agerite Stalite | 5 |
| Boron ester compound [b] | 10 |

[a] An S.A.E. 30 western solvent treated napthenic mineral lubricating oil.
[b] The reaction product obtained by heating mixture of 43 grams of octyl diethanolamine and 12.4 grams of orthoboric acid to temperature of 250° F. and cooling the reaction product.

This grease was prepared following the method described in Example II and contained 14% soap, and had a penetration of 142, an ASTM dropping point of 357° F., and softened 18 points in the Shell roll test. This grease was reversible on the hot plate.

Example VI

A grease of this invention was prepared with the following ingredients:

| | Grams |
|---|---|
| 12-hydroxystearic acid | 300 |
| Barium hydroxide pentahydrate | 135 |
| Mineral lubricating oil [a] | 2200 |
| Agerite Stalite | 5 |
| Boron ester compound [b] | 10 |

[a] An S.A.E. 30 western solvent treated naphthenic mineral lubricating oil.
[b] The reaction product obtained by heating mixture of 37.4 grams of cyclohexyl diethanolamine and 12.4 grams of orthoboric acid to temperature of 350° F., and cooling the reaction product.

This grease was prepared following the method described in Example II and contained 15.8% of soap, and had a penetration of 145, an ASTM dropping point of 352° F., and softened 15 points in the Shell roll test. This grease was reversible on the hot plate.

Example VII

A grease of this invention was prepared with the following ingredients:

| | Grams |
|---|---|
| 12-hydroxystearic acid | 300 |
| Barium hydroxide pentahydrate | 135 |
| Mineral lubrating oil [a] | 2200 |
| Agerite Stalite | 5 |
| Boron ester compound [b] | 10 |

[a] An S.A.E. 30 western solvent treated naphthenic mineral lubricating oil.
[b] The reaction product obtained by heating a mixture of 36.2 grams of phenyl diethanolamine and 12.4 grams of orthoboric acid to a temperature of 250° F., and cooling the reaction product.

This grease was prepared following the method described in Example II, and contained 16% of soap. It had a penetration of 132, an ASTM dropping point of 358° F., and softened 9 points in the Shell roll test. This grease was reversible on the hot plate.

Example VIII

A grease of this invention was prepared with the following ingredients:

| | Grams |
|---|---|
| 12-hydroxystearic acid | 300 |
| Barium hydroxide pentahydrate | 135 |
| Mineral lubricating oil [a] | 2200 |
| Agerite Stalite | 5 |
| Boron ester compound [b] | 10 |

[a] An S.A.E. 30 western solvent treated and dewaxed paraffinic mineral lubricating oil.
[b] The reaction product obtained by heating a mixture of 30 grams of dimethyl ethanolamine and 10.5 grams of orthoboric acid to a temperature of 250° F., and cooling the reaction product.

This grease was prepared following the method described in Example II and contained 17% of soap, had a penetration of 127, an ASTM dropping point of 348° F., and softened 14 points in the Shell roll test. This grease was reversible on the hot plate.

Example IX

A grease of this invention was prepared with the following ingredients:

| | Grams |
|---|---|
| 12-hydroxystearic acid | 300 |
| Barium hydroxide pentahydrate | 135 |
| Mineral lubricating oil [a] | 2200 |
| Agerite Stalite | 5 |
| Boron ester compound [b] | 10 |

[a] An S.A.E. 30 western solvent treated naphthenic mineral lubricating oil.
[b] The reaction product obtained by heating mixture of 40 grams of ditolyl ethanolamine and 8.2 grams of orthoboric acid to a temperature of 250° F., and cooling the reaction product.

This grease was prepared following the method described in Example II, and contained 15.5% of soap, had a penetration of 143, an ASTM dropping point of 350° F., and softened 17 points in the Shell roll test. This grease was reversible on the hot plate.

The above examples show the effect of adding the boron compounds of this invention to greases thickened with barium 12-hydroxystearate. Whereas the product of Example I is nonreversible and softens badly in the Shell roll test, the products of Examples II to IX, inclusive, which contain an alkanolamineorthoboric acid product, are all reversible and all have good mechanical stability as indicated by the results of the Shell roll test. Moreover, the thickening power of the barium 12-hydroxystearate is greater in the presence of one of the boron ester compounds of this invention and for a given soap content the dropping point of the grease is higher.

The foregoing examples and description of this invention are illustrative of the invention but are not to be considered as limiting the invention to the particular compositions shown as other similar compositions obtained by varying the proportions of soap and boron compound employed and by using other alkanolamines in preparing the boron ester compounds are included within this invention as set forth in the following claims.

I claim:

1. A lubricating grease consisting essentially of mineral lubricating oil thickened with about 3% to about 30% by weight of barium 12-hydroxy stearate and containing between about 0.05% and about 5% by weight of the reaction product of 1 equivalent of an alkanolamine with between about 1.4 and about 1.7 equivalents of orthoboric acid in which said reaction is carried out at a temperature between about 215° F. and about 400° F.

2. A lubricating grease according to claim 1 in which said alkanolamine is triethanolamine.

3. A lubricating composition according to claim 1 in which said alkanolamine is triethanolamine.

4. A lubricating grease consisting essentially of mineral lubricating oil thickened with about 3% to about 30% by weight of barium 12-hydroxy stearate and containing between about 0.05% and about 5% by weight of the reaction product of 1 equivalent of a compound of the formula

$$R_xN(R'OH)_{3-x}$$

in which R is selected from the class consisting of hydrogen and hydrocarbon radicals, R' is a divalent alkyl radical of 2 to 3 carbon atoms and $x$ is a whole number of 0 to 2, inclusive, with between about 1.4 and about 1.7 equivalents of orthoboric acid in which said reaction is carried out at a temperature between about 215° F. and about 400° F.

5. A lubricating grease according to claim 4 in which the amount of said reaction product is between about 0.1% and about 2.0% by weight.

6. A lubricating grease consisting essentially of mineral lubricating oil thickened with about 5% to about 20% by weight of barium 12-hydroxy stearate and containing a small amount, between about 0.1% and about 2.0% by weight, sufficient to impart good mechanical stability and reversibility characteristics to said grease, of the reaction product of 1 equivalent of an alkanolamine having the formula $$R_xN(R'OH)_{3-x}$$

in which R is selected from the class consisting of hydrogen and hydrocarbon radicals, R' is a divalent alkyl radical of 2 to 3 carbon atoms and $x$ is a whole number of 0 to 2, inclusive, with between about 1.4 and about 1.7 equivalents of orthoboric acid in which said reaction is carried out at a temperature between about 215° F. and about 400° F.

7. A method of preparing a barium 12-hydroxy stearate grease having good mechanical stability and reversibility which comprises adding to a mineral lubricating oil thickened with barium 12-hydroxy stearate between about 0.05% and about 5% by weight of a boron compound obtained by heating to a temperature between about 215° F., and about 350° F., a mixture of 1.4 to 1.7 equivalents of orthoboric acid and 1 equivalent of an alkanolamine and heating the resulting grease mixture to a temperature between about 300° F. and about 360° F.

8. A method according to claim 7 in which said alkanolamine is triethanolamine.

9. A method according to claim 7 in which between 0.1% and 2.0% by weight of said boron compound is added.

References Cited in the file of this patent

UNITED STATES PATENTS

| | | |
|---|---|---|
| 2,607,735 | Sproule et al. | Aug. 19, 1952 |
| 2,815,325 | Pohorilla et al. | Dec. 3, 1957 |